United States Patent
Campos de Leon

(10) Patent No.: US 9,524,655 B1
(45) Date of Patent: Dec. 20, 2016

(54) INTERACTIVE BRAILLE DISPLAY APPARATUS

(71) Applicant: International Business Machines Corporation, Armonk, NY (US)

(72) Inventor: Gerardo M. Campos de Leon, Guadalajara (MX)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/988,219

(22) Filed: Jan. 5, 2016

(51) Int. Cl.
*G09B 21/02* (2006.01)
*G09B 21/00* (2006.01)

(52) U.S. Cl.
CPC ........... *G09B 21/005* (2013.01); *G09B 21/004* (2013.01)

(58) Field of Classification Search
CPC ............................ G09B 21/004; G09B 21/025
USPC ......................................... 434/113, 114, 115
See application file for complete search history.

(56) References Cited

U.S. PATENT DOCUMENTS

| | | | | |
|---|---|---|---|---|
| 5,449,292 | A * | 9/1995 | Tani | G09B 21/004 340/4.12 |
| 6,827,512 | B1 * | 12/2004 | Souluer | B41J 3/32 400/109.1 |
| 6,893,263 | B2 * | 5/2005 | Tretiakoff | G09B 21/004 340/407.1 |
| 7,407,335 | B2 * | 8/2008 | Damery | B41J 3/32 400/109.1 |
| 8,382,480 | B2 | 2/2013 | Bucchieri | |
| 8,425,232 | B2 | 4/2013 | Fukami | |
| 8,690,576 | B2 | 4/2014 | Murphy et al. | |
| 2012/0214139 | A1 * | 8/2012 | Murphy | G09B 21/004 434/114 |
| 2013/0004921 | A1 * | 1/2013 | Takahashi | G09B 21/004 434/113 |

(Continued)

FOREIGN PATENT DOCUMENTS

| | | |
|---|---|---|
| EP | 2608189 A | 6/2013 |
| WO | 2014210034 A1 | 12/2014 |

OTHER PUBLICATIONS

Arif, "Electronic Braille Document Reader". Masters thesis, University of Huddersfield, Aug. 8, 2013, all pages.

(Continued)

*Primary Examiner* — Sam Yao
*Assistant Examiner* — Peter J Alley
(74) *Attorney, Agent, or Firm* — Law Offices of Ira D. Blecker, P.C.

(57) ABSTRACT

An interactive Braille display apparatus which includes a frame; 3-sided rotating members installed within the frame such that only one side of the 3-sided rotating members is displayed at a time. Each 3-sided rotating member includes a flat side; a first raised portion side having a first raised portion; a second raised portion side having a second raised portion connected to an input device to receive an input from a user, the second raised portion having a height greater than the height of the first raised portion. The apparatus further includes a microprocessor electrically connected to each clickable switch of each second raised portion, the microprocessor detecting when the clickable switch of at least one second raised portion has been depressed by the user and outputting that the clickable switch of the at least one second raised portion has been depressed.

17 Claims, 8 Drawing Sheets

(56) References Cited

U.S. PATENT DOCUMENTS

2013/0004922 A1\* 1/2013 Takahashi ............... G06F 3/016
  434/113
2013/0203022 A1\* 8/2013 Al-Qudsi ............. G09B 21/004
  434/113

OTHER PUBLICATIONS

Wang et al., "Portable Refreshable Braille Display", Available online <URL: https://courses.engr.illinois.edu/ece445/getfile.asp?id=5200>, Feb. 8, 2012, all pages.

\* cited by examiner

INTERACTIVE BRAILLE DISPLAY APPARATUS

BACKGROUND

The present exemplary embodiments pertain to an interactive Braille display apparatus in which Braille characters may be displayed to a visually-impaired person who may interactively provide an input to the Braille display.

Braille is a tactile writing system used by people who are visually-impaired. Braille is traditionally written with embossed paper. However, Braille-users can read computer screens and other electronic supports thanks to refreshable braille displays. Braille characters are small rectangular blocks called cells that contain tiny palpable bumps called raised dots. The number and arrangement of these dots distinguish one character from another. In Braille, an aggregate of physically raised dots arranged in a matrix of 2 columns by 3 rows (6 dots) or 2 columns by 4 rows (8 dots) represents hiragana characters, and a person touches the aggregate with his/her finger to recognize the characters.

Conventional devices exist for displaying text on a computer monitor screen in Braille notation which may be read by a visually-impaired person. These devices may typically display only two lines of 80 character text. Further, these devices do not allow the reader of the display to provide some input related to the text being read. For example, if the reader was reading text from an online source in which there is a link to go to another page or another website, the reader is unable to "click" that link to go to the other page or website.

BRIEF SUMMARY

The various advantages and purposes of the exemplary embodiments as described above and hereafter are achieved by providing, according to a first aspect of the exemplary embodiments, an interactive Braille display apparatus which includes a frame; and a plurality of 3-sided rotating members installed within the frame such that only one side of the 3-sided rotating members is displayed at a time. Each 3-sided rotating member comprising: a flat side; a first raised portion side having a first raised portion; and a second raised portion side having a second raised portion connected to an input device to receive an input from a user, the second raised portion having a height greater than the height of the first raised portion. The apparatus further includes a microprocessor electrically connected to each input device of each second raised portion, the microprocessor detecting when the input device of at least one second raised portion has been depressed by the user and outputting that the input device of the at least one second raised portion has been depressed.

According to a second aspect of the exemplary embodiments, there is provided an interactive Braille display apparatus which includes a central processing unit (CPU); a frame; and a plurality of 3-sided rotating members installed within the frame such that only one side of the 3-sided rotating members is displayed at a time. Each 3-sided rotating member comprising: a flat side; a first raised portion side having a first raised portion; and a second raised portion side having a second raised portion connected to an input device to receive an input from a user, the second raised portion having a height greater than the height of the first raised portion. The apparatus further includes; a movable actuator within the frame, the actuator rotating the each 3-sided member to display the flat side, the first raised portion side or the second raised portion side according to an instruction from the CPU; and a microprocessor electrically connected to each input device of each second raised portion, the microprocessor detecting when the input device of at least one second raised portion has been depressed by the user and outputting to the CPU that the input device of the at least one second raised portion has been depressed, the CPU taking an action as directed by the depressed at least one second raised portion.

According to a third aspect of the exemplary embodiments there is provided a 3-sided rotating member for an interaction Braille displayed apparatus comprising: a flat side; a first raised portion side having a first raised portion; and a second raised portion side having a second raised portion connected to an input device to receive an input from a user and output the input, the second raised portion having a height greater than the height of the first raised portion.

BRIEF DESCRIPTION OF SEVERAL VIEWS OF THE DRAWINGS

The features of the exemplary embodiments believed to be novel and the elements characteristic of the exemplary embodiments are set forth with particularity in the appended claims. The Figures are for illustration purposes only and are not drawn to scale. The exemplary embodiments, both as to organization and method of operation, may best be understood by reference to the detailed description which follows taken in conjunction with the accompanying drawings in which:

DETAILED DESCRIPTION

The present inventor has proposed an interactive Braille display which allows a visually-impaired person to read Braille characters and also to provide input as if the visually-impaired person were using a conventional computing device.

Figure 1:
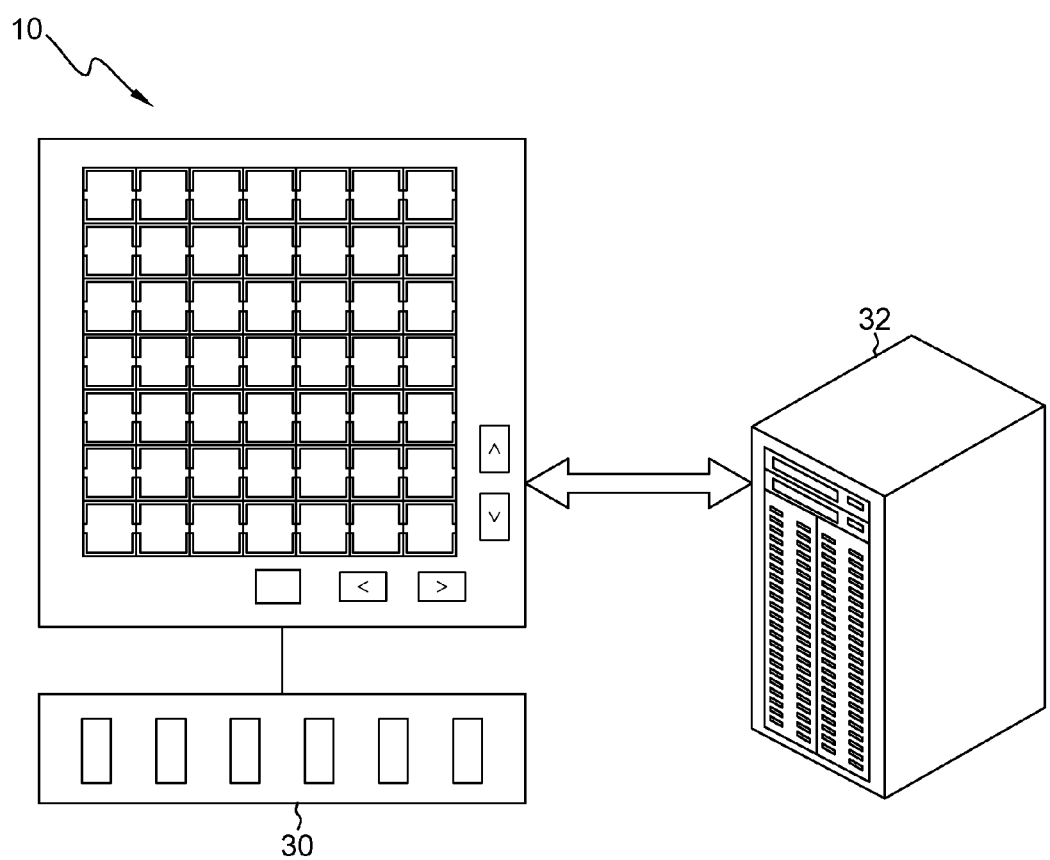
FIG. 1 illustrates an exemplary embodiment of an interactive Braille display apparatus in communication with a computing device according to the exemplary embodiments.

Referring to the Figures in more detail, and particularly referring to FIG. 1, there is illustrated an exemplary embodiment of an interactive Braille display apparatus 10 which may also include a computing device 32, such as a desktop computer (shown in FIG. 1), a laptop or a smartphone, wired or wirelessly connected to the Braille display apparatus 10, and a Braille keyboard 30. In operation, the computing device 32 may display text and images in a Braille format on the interactive Braille display apparatus 10.

The displayed text and images may have areas in which a visually-impaired person may be required to enter information such as a user ID or password as would be the case if the visually-impaired person wanted to access their email account. The Braille keyboard 30 may be used to enter such information.

The displayed text and images may also have active links which when selected may take a user to another page or another website. For a sighted person, it is simple enough to mouse-click on the link that is displayed on a conventional visual display to go to the other page or website. However, for a visually-impaired person using a conventional refreshable Braille display, there are no means available in the conventional refreshable Braille display for a visually-impaired person to click on that link.

Figure 2:
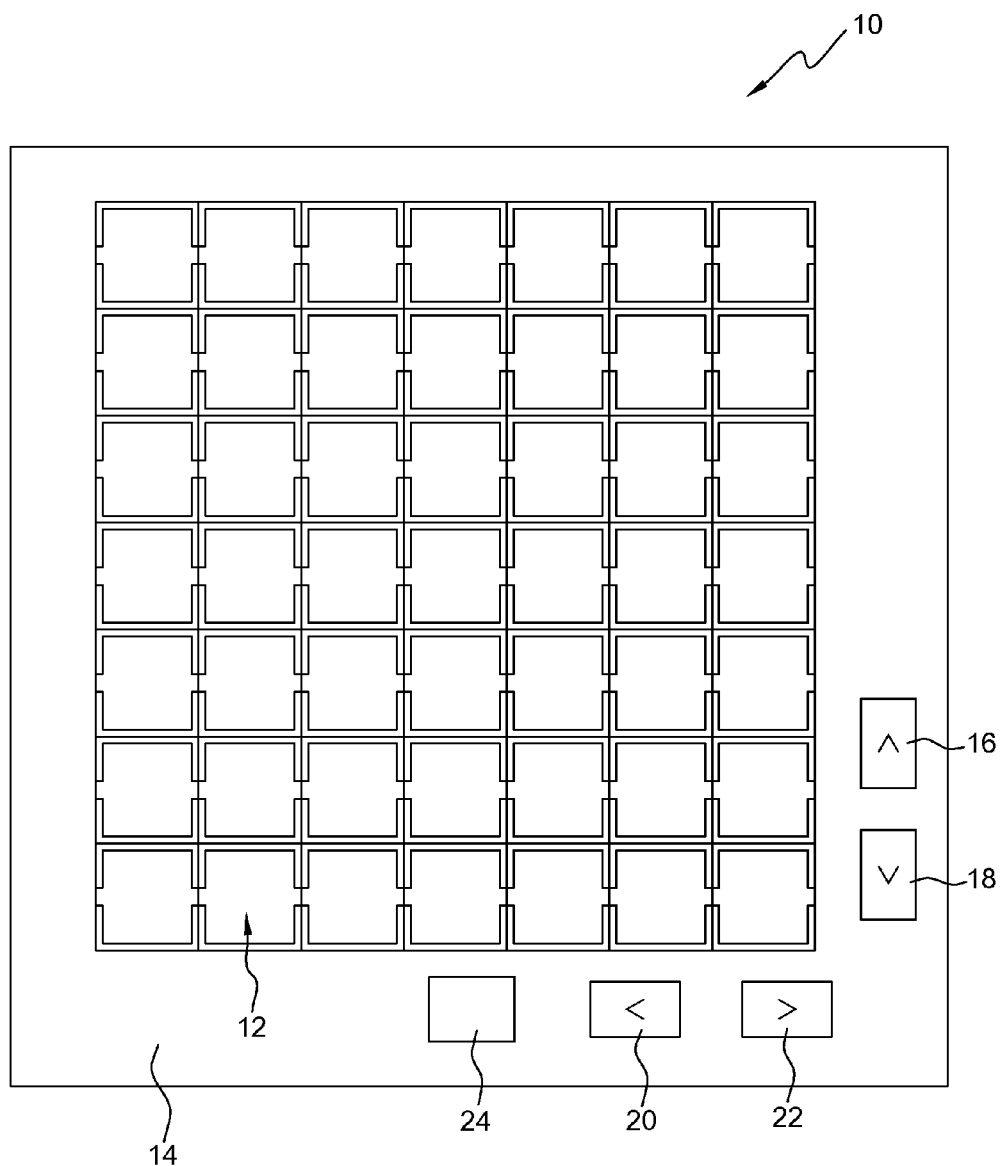
FIG. 2 is an illustration of an interactive Braille display apparatus with no Braille characters displayed according to the exemplary embodiments.

Referring now to FIG. 2, there is illustrated in more detail the interactive Braille display apparatus 10 (hereafter just "apparatus") according to the exemplary embodiments. The apparatus 10 may include a plurality of 3-sided members 12 installed in a frame 14. The 3-sided members 12 are able to rotate within the frame 14 so that each of the 3 sides of the 3-sided member 12 may be displayed as needed to display a Braille character. One side of the 3-sided members 12 may be a flat surface which is shown in FIG. 2. The 3-sided members 12 will be discussed in more detail hereafter.

The apparatus 10 shown in FIG. 2 is, for the purpose of illustration and not limitation, a 7 by 7 grid of 3-sided members 12. The apparatus 10 may be of any size. For example, hand held devices may want a smaller grid size while larger desktop displays may want a much larger grid size.

The apparatus 10 may further include a scroll up button 16, a scroll down button 18, a scroll left button 20 and a scroll right button 22. The apparatus 10 may also conveniently include a "home" button 24 to enable repositioning of the document to the upper left corner of the apparatus 10. The grid of 3-sided members 12 may be fixed in a frame 14.

Figure 3:
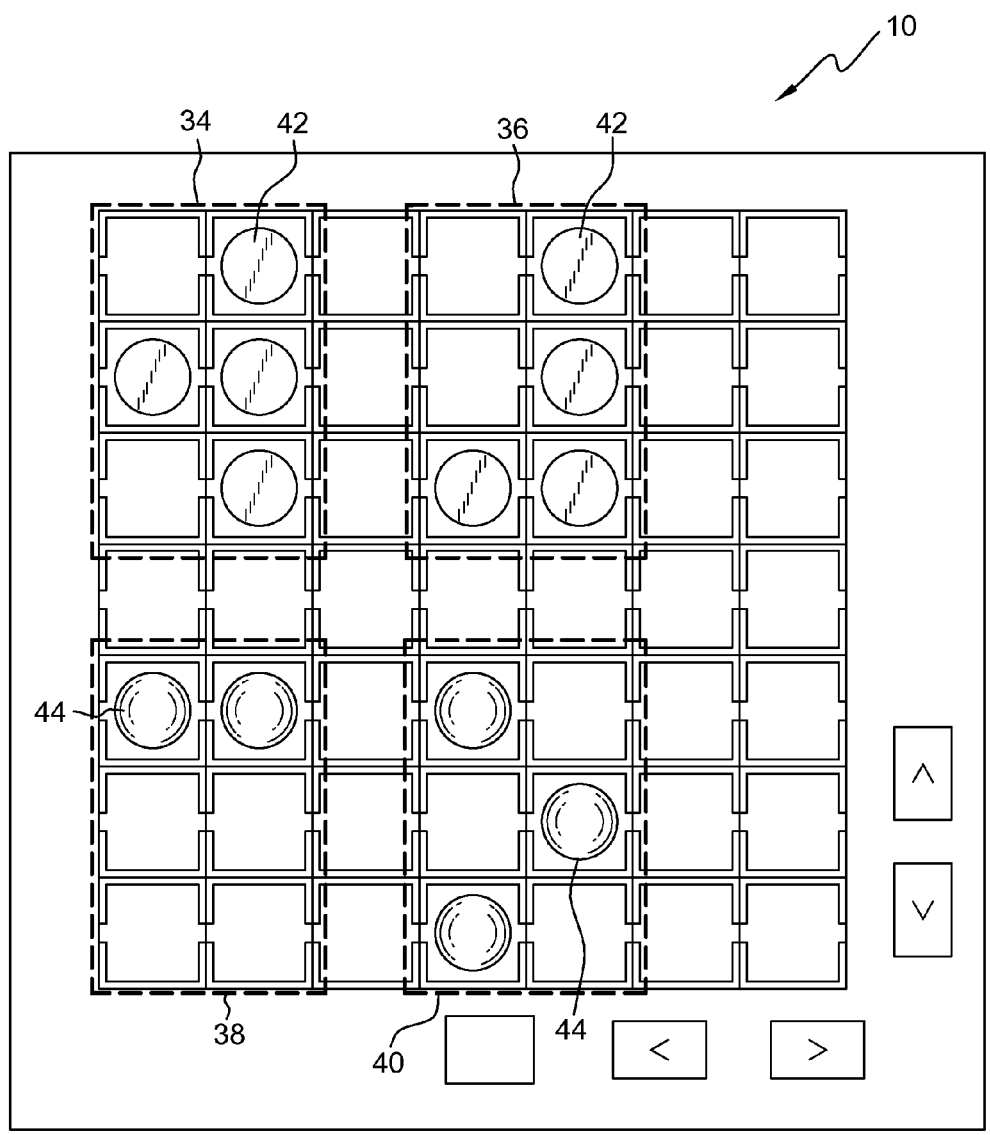
FIG. 3 is an illustration of an interactive Braille display apparatus with Braille characters displayed according to the exemplary embodiments.

Referring now to FIG. 3, the computing device 32 has caused several Braille characters 34, 36, 38, 40 to be displayed in apparatus 10. These Braille characters are displayed by the 3-sided members 12 which have been rotated from their flat surface shown in FIG. 2 to the raised portions shown in FIG. 3. Each Braille character may have from one to six raised portions in a 2 by 3 array. The present exemplary embodiments may also be used when each Braille character may have from one to eight raised portions in a 2 by 4 array.

Braille character 34 has first raised portions 42 of the 3-sided members 12 arranged in an order which according to the Braille alphabet represents the letter "w". Braille character 36 has first raised portions 42 of the 3-sided members 12 arranged in an order which according to the Braille alphabet represents the "#" sign. The blank portions of Braille characters 34, 36 may be provided by the flat surface of the 3-sided members 12.

The Braille characters may be positioned in any row and column of the apparatus 10. As shown in FIG. 3, Braille character 34 is in columns 1-2, rows 1-3 and Braille character 36 is in columns 4-5, rows 1-3 with blank 3-sided members 12 between Braille characters 34 and 36. However, the Braille characters 34, 36 may be shifted up or down or over in other columns and rows as well, depending on the text that is being displayed on the apparatus 10.

A visually-impaired person may move their fingers over the first raised portions 42 to read the Braille letters as a visually-impaired person would conventionally do with a refreshable Braille display.

It is to be noted that both the flat surfaces and the first raised portions 42 of the 3-sided members 12 are nonfunctional. That is, in the context of the exemplary embodiments, nonfunctional means that a visually-impaired person may read the Braille characters 34, 36 but pressing on them, as if to press on a link, would cause no action in the apparatus 10 to occur. In other words, the flat surfaces and the first raised surfaces 42 are "read only".

However, the remaining Braille characters 38, 40 shown in FIG. 3 have functional portions. Braille character 38 has second raised portions 44 arranged in an order which according to the Braille alphabet represents the letter "c". Braille character 40 has second raised portions 44 arranged in an order which according to the Braille alphabet represents the letter "o". The blank portions of Braille characters 38, 40 may be provided by the flat surface of the 3-sided members 12.

Second raised portions 44 have a greater height than first raised portions 42. A typical height for first raised portions may be 1 mm (millimeter) while the second raised portions 44 may have a height of about 1.8 mm. The difference in height between the first raised portions 42 and the second raised portions 44 should be enough that a visually-impaired person can tell the difference between the two raised portions 42, 44.

Pressing on either of the second raised portions 44 in Braille character 38 results in an input that may cause an action to occur. Similarly, pressing on any of the second raised portions 44 in Braille character 40 results in an input that may cause an action to occur. Functional, in the context of the exemplary embodiments, means that pressing on any of the second raised portions 44 may cause an action in the apparatus 10 to occur.

While only first raised portions 42 are shown in Braille characters 34, 36 and only second raised portions 44 are shown in Braille characters 38, 40, it is within the scope of the exemplary embodiments to have both first raised portions 42 and second raised portions 44 in the same Braille character. In such an embodiment, only the second raised portions 44 would still be functional.

In a conventional display for a sighted person having an active link, pressing on any part of the link results in an input that may cause an action in the display to occur such as redirection to another website. Likewise, pressing on any Braille character in any link displayed in the apparatus 10 may result in an input that may cause an action in the apparatus 10 to occur because of the functional second raised portions 44. In the illustrated Braille characters 38, 40 of FIG. 3, if the Braille characters 38, 40 are part of the same link, then pressing either of the Braille characters 38, 40, or any part thereof, results in the input that may cause an action to occur. Alternatively, Braille characters 38, 40 may be parts of separate links so that pressing Braille character 38 or 40, or any part of Braille character 38 or 40, results in the input that may cause an action to occur for the link corresponding to Braille character 38 or 40, whichever one was pressed.

Figure 4A:
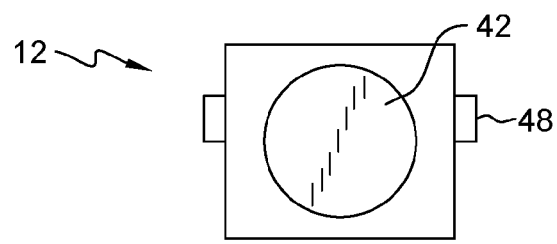
FIGS. 4A to 4D are views of a 3-sided member for use in an interactive Braille display apparatus according to the exemplary embodiments.
Figure 4B:
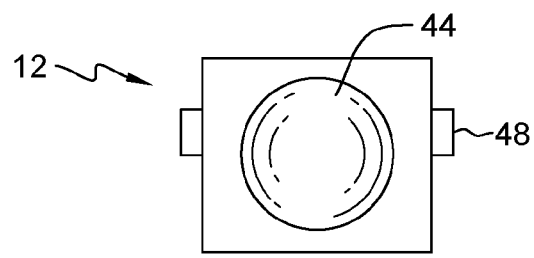
Figure 4C:
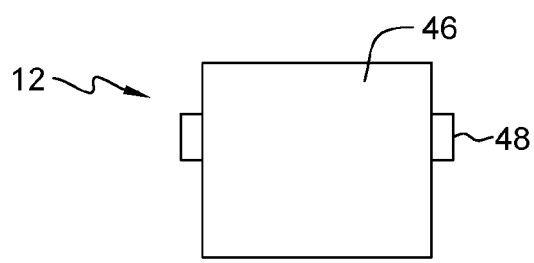
Figure 4D:
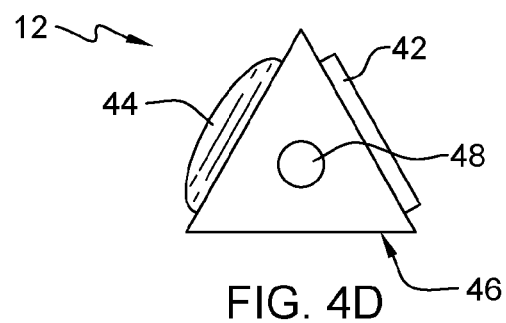

The 3-sided member 12 is shown in more detail in FIGS. 4A to 4D. The 3-sided member 12 has an axis 48 which may mate with a complimentary fixture in the frame 14 so that the 3-sided member 12 is able to rotate within the frame 14. The side having the first raised portion 42 (indicated by a circle) is shown in FIG. 4A while the side having the second raised portion 44 (indicated by a contoured circle) is shown in FIG. 4B. FIG. 4C illustrates the flat surface 46 of the 3-sided member 12. FIG. 4D is an end (axis) view of the 3-sided member 12 showing the triangular shape of the 3-sided member 12, axis 48, first raised portion 42, second raised portion 44 and flat surface 46. The significant difference in height detectable by a visually-impaired person between the first raised portion 42 and the second raised portion 44 is shown in FIG. 4D, In operation, the computing device 32 may send an instruction to the apparatus 10. The instruction may indicate which side of the 3-sided member 12 is to be displayed to the visually-impaired person. An actuator in the apparatus 10 may receive the instruction and may rotate the 3-sided member 12 to display the side called for by the instruction from the computing device 32.

Figure 7A:
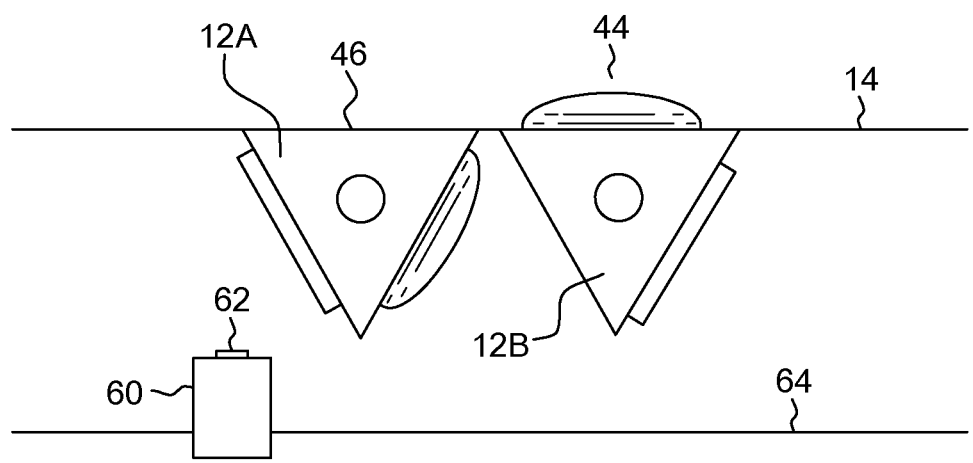
FIGS. 7A to 7D are cross-sectional views illustrating the operation of one exemplary embodiment of an actuator for rotating the 3-sided members of FIGS. 4A to 4D.

FIGS. 7A to 7D are cross-sectional illustrations of one exemplary embodiment of an actuator for the purpose of illustration and not limitation. Referring first to FIG. 7A, there is illustrated 3-sided members 12A and 12B within the frame 14 of the apparatus 10. The 3-sided member 12A is displaying the flat (or blank) side 46 while 3-sided member 12B is displaying the second raised portion 44. Below the 3-sided members 12A, 12B is an actuator 60 having an extendible piston 62. The actuator 60 may ride on a rail 64 below the 3-sided members 12A, 12B and there may be one actuator for each column of 3-sided members 12. In FIG. 7A, the piston 62 of the actuator 60 is retracted so that it may move freely beneath the 3-sided members 12 without touching them.

Figure 7B:
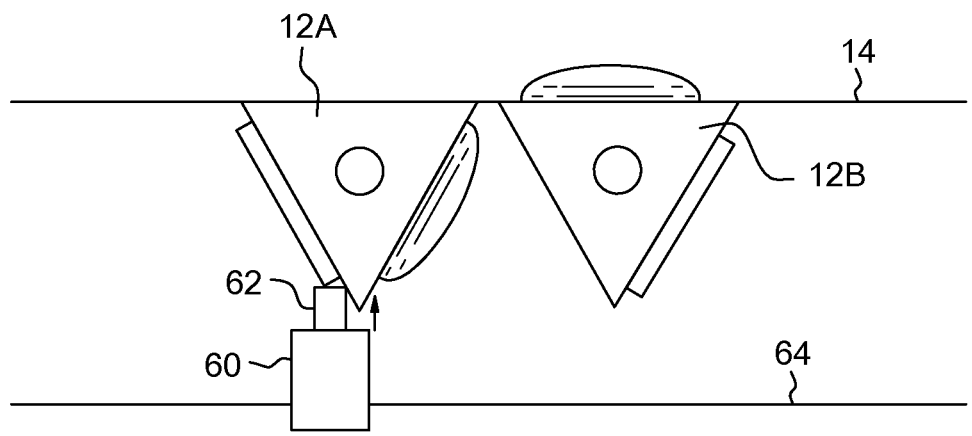

In FIG. 7B, the actuator 60 has been moved to be underneath 3-sided member 12A and the piston 62 of the actuator 60 has been partially extended to make contact with the 3-sided member 12A.

Figure 7C:
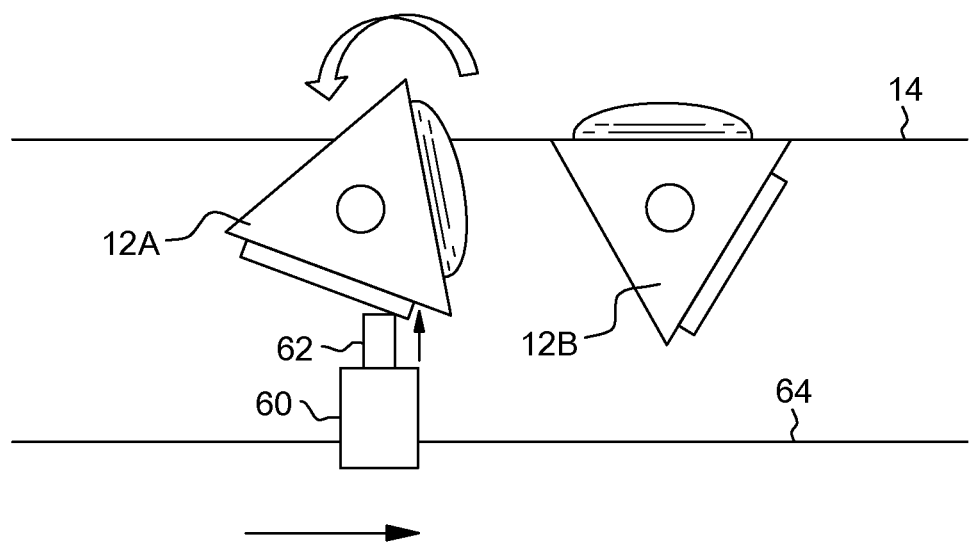
Figure 7D:
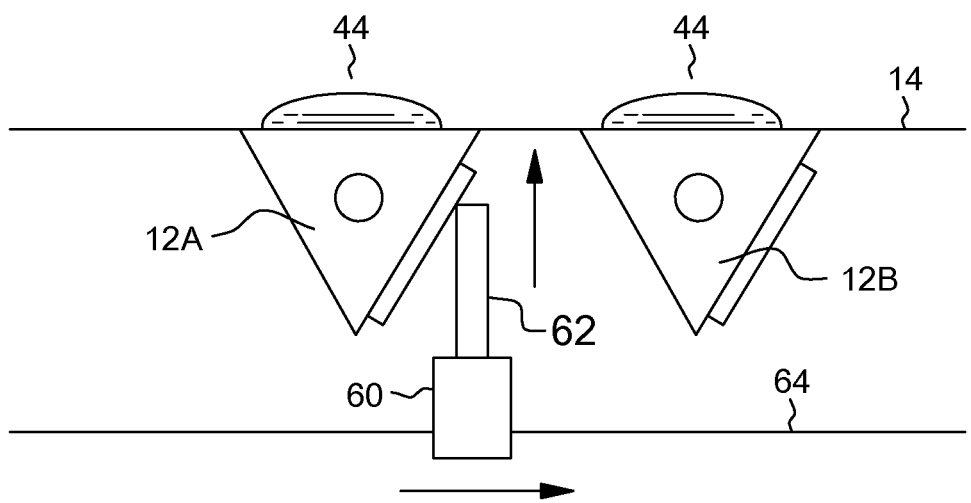

In FIG. 7C, the actuator 60 is moved to the right while also further extending the piston 62 causing the 3-sided member 12A to partially rotate. In FIG. 7D, the actuator 60 continues to move to the right while further extending the piston 62 to cause the 3-sided member 12A to fully rotate so as to display the second raised portion 44.

The actuator 60 may be moved along the rail 64 by means such as a servo motor or a stepper motor. After the 3-sided member 12A has been fully rotated, the piston 62 may be fully retracted and the actuator 60 moved to the next 3-sided member 12 to rotate.

When the side of the 3-sided member 12 having the second raised portion 44 is displayed, a visually-impaired person may press on the second raised portion 44 to input an action to the apparatus 10. The 3-sided member 12 may contain an input device. The input device may be any electrical component that may close an electrical circuit to cause the flow of current to occur.

Figures 5A, 5B:
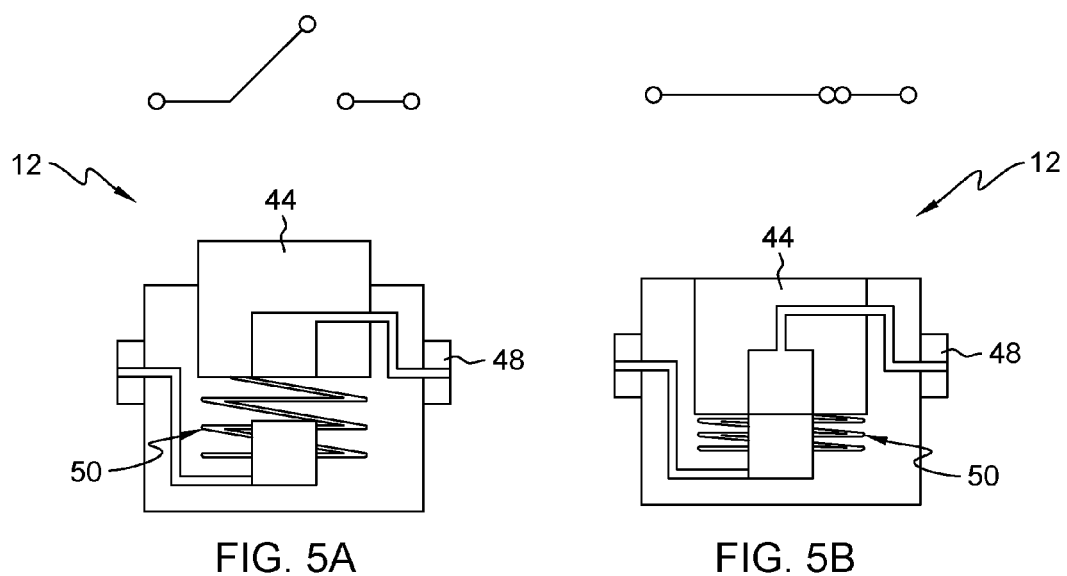
FIGS. 5A and 5B are cross-sectional views of the 3-sided member of FIGS. 4A to 4D illustrating a clickable switch for making one portion of the 3-sided member interactive.

One exemplary embodiment of an input device is a clickable switch 50 for use in the exemplary embodiments is illustrated in FIGS. 5A and 5B which show a cross section of 3-sided member 12. In FIG. 5A, the second raised portion 44 has not been pressed so that the clickable switch 50 is in the open state. An open switch is further indicated in the circuit diagram above the 3-sided member 12 in FIG. 5A. In FIG. 5B, the second raised portion 44 has been pressed so that the clickable switch 50 is now in the closed state. A closed switch is further indicated in the circuit diagram above the 3-Sided member 12 in FIG. 5B. In the embodiment of the clickable switch 50 shown in FIGS. 5A and 5B, the axis 48, partially or entirely, may be conductive to carry the closed switch signal within the apparatus 10.

Other embodiments of input devices such as piezoelectric switches and membrane switches may be used with the 3-sided members 12 and are considered within the scope of the exemplary embodiments.

Figure 6:
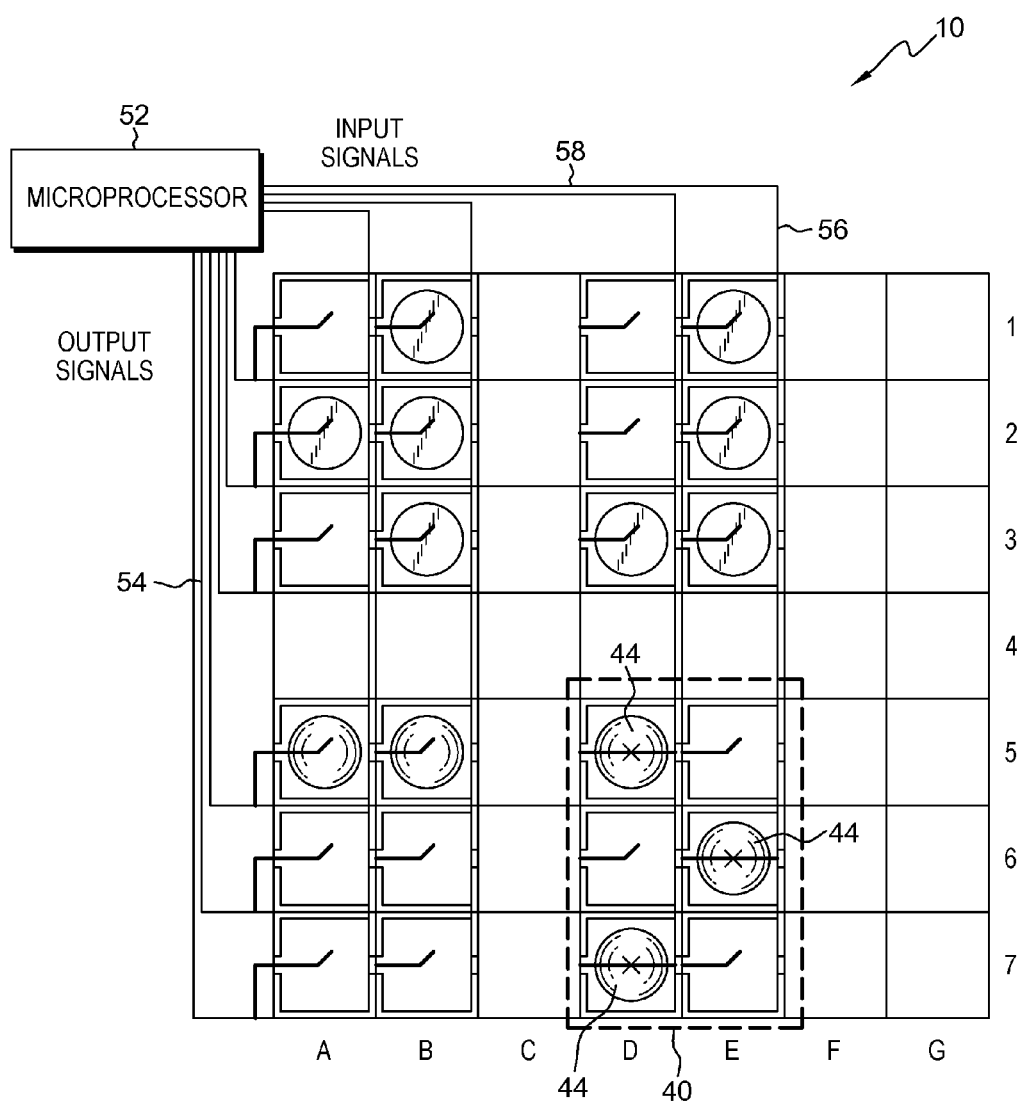
FIG. 6 is a wiring diagram of an interactive Braille display apparatus according to the exemplary embodiments.

An exemplary embodiment of a wiring layout for the apparatus 10 is illustrated in FIG. 6. A microprocessor 52 may scan the entire apparatus 10 by sending output signals through wiring 54 to each 3-sided member 12. In the illustration of FIG. 6, a visually-impaired person may desire to press the Braille character 40 which represents the letter "o". To press the Braille character 40, the visually-impaired person may press the second raised portions 44 indicated at grid D5, E6 and D7, also indicated with an "X" in the second raised portion 44, to register that the letter "o" has been pressed. In one exemplary embodiment, the visually-impaired person may only need to press one of the second raised portions 44 of Braille character 40 to register that the letter "o" has been pressed. In this case, the second raised portion 44 at grid E6 has been pressed causing clickable switch 50 (FIG. 5B) to close and send an input signal through axis 48 to wiring line 56 of input wiring 58. Microprocessor 52, upon receiving the input signal through wiring 56, 58 detects that the second raised portion 44 off Braille character 40 has been pressed. The information that the second raised portion 44 of Braille character 40 has been pressed is passed to computing device 32 which may then act on the input from Braille character 40 to, for example, go to another web page or another website.

It will be apparent to those skilled in the art having regard to this disclosure that other modifications of the exemplary embodiments beyond those embodiments specifically described here may be made without departing from the spirit of the invention. Accordingly, such modifications are considered within the scope of the invention as limited solely by the appended claims.

What is claimed is:

1. An interactive Braille display apparatus comprising:
a frame;
a plurality of 3-sided rotating members installed within the frame such that only one side of the 3-sided rotating members is displayed at a time, each 3-sided rotating member comprising:
a flat side;
a first raised portion side having a first raised portion;
a second raised portion side having a second raised portion connected to an input device to receive an input from a user, the second raised portion having a height greater than the height of the first raised portion; and
a microprocessor electrically connected to each input device of each second raised portion, the microprocessor detecting when the input device of at least one second raised portion has been depressed by the user and outputting that the input device of the at least one second raised portion has been depressed.

2. The display apparatus of claim 1 further comprising an actuator connected to each 3-sided member, the actuator rotating the each 3-sided member to display the flat side, the first raised portion side or the second raised portion side.

3. The display apparatus of claim 1 wherein the plurality of 3-sided rotating members are arranged in a grid on the frame.

4. The display apparatus of claim 3 wherein the plurality of 3-sided rotating members are organized in groupings of 6 and arranged in the grid by 2 columns by 3 rows wherein each grouping of 6 3-sided members represents a letter in a Braille alphabet.

5. The display apparatus of claim 4 wherein at least one grouping of 6 3-sided rotating members contains a plurality of second raised portion sides displayed and wherein only one second raised portion depressed will cause the microprocessor to detect the letter.

6. The display apparatus of claim 3 wherein the plurality of 3-sided rotating members are organized in groupings of 8 and arranged in the grid by 2 columns by 4 rows wherein each grouping of 8 3-sided members represents a letter in a Braille alphabet.

7. The display apparatus of claim 6 wherein at least one grouping of 8 3-sided rotating members contains a plurality of second raised portion sides displayed and wherein only one second raised portion depressed will cause the microprocessor to detect the letter.

8. The display apparatus of claim 1 wherein the flat side and the first raised portion side of the 3-sided rotating members are nonfunctional in that the flat side and the first raised portion side cannot output an input from the user.

9. The display apparatus of claim 1 wherein the input device is a clickable switch.

10. An interactive Braille display apparatus comprising:
   a central processing unit (CPU);
   a frame;
   a plurality of 3-sided rotating members installed within the frame such that only one side of the 3-sided rotating members is displayed at a time, each 3-sided rotating member comprising:
      a flat side;
      a first raised portion side having a first raised portion; and
      a second raised portion side having a second raised portion connected to an input device to receive an input from a user, the second raised portion having a height greater than the height of the first raised portion;
   a movable actuator within the frame, the actuator rotating the each 3-sided member to display the flat side, the first raised portion side or the second raised portion side according to an instruction from the CPU; and
   a microprocessor electrically connected to each input device of each second raised portion, the microprocessor detecting when the input device of at least one second raised portion has been depressed by the user and outputting to the CPU that the input device of the at least one second raised portion has been depressed, the CPU taking an action as directed by the depressed at least one second raised portion.

11. The display apparatus of claim 10 wherein the plurality of 3-sided rotating members are arranged in a grid on the frame.

12. The display apparatus of claim 11 wherein the plurality of 3-sided rotating members are organized in groupings of 6 and arranged in the grid by 2 columns by 3 rows wherein each grouping of 6 3-sided members represents a letter in a Braille alphabet.

13. The display apparatus of claim 12 wherein at least one grouping of 6 3-sided rotating members contains a plurality of second raised portion sides displayed and wherein only one second raised portion depressed will cause the microprocessor to detect the letter.

14. The display apparatus of claim 11 wherein the plurality of 3-sided rotating members are organized in groupings of 8 and arranged in the grid by 2 columns by 4 rows wherein each grouping of 8 3-sided members represents a letter in a Braille alphabet.

15. The display apparatus of claim 14 wherein at least one grouping of 8 3-sided rotating members contains a plurality of second raised portion sides displayed and wherein only one second raised portion depressed will cause the microprocessor to detect the letter.

16. The display apparatus of claim 10 wherein the flat side and the first raised portion side of the 3-sided rotating members are nonfunctional in that the flat side and the first raised portion side cannot output an input from the user.

17. The display apparatus of claim 10 wherein the input device is a clickable switch.

* * * * *